United States Patent [19]

Sugiyama et al.

[11] 4,384,682
[45] May 24, 1983

[54] ROTARY TYPE ELECTROSTATIC SPRAY PAINTING DEVICE

[75] Inventors: Matsuyoshi Sugiyama, Susono; Teru Morishita, Shizuoka; Toshikazu Suzuki, Toyota, all of Japan

[73] Assignee: Toyota Jidosha Kabushiki Kaisha, Toyota, Japan

[21] Appl. No.: 197,134

[22] Filed: Oct. 15, 1980

[30] Foreign Application Priority Data

May 23, 1980 [JP] Japan .................. 55-67914

[51] Int. Cl.³ .............................. B05B 5/04
[52] U.S. Cl. .................. 239/703; 239/223; 384/118; 384/121
[58] Field of Search ............ 239/700–703, 239/214, 223, 224; 308/9, 10, 15, 121, 122, 168, 170, 174, DIG. 1, DIG. 5

[56] References Cited

U.S. PATENT DOCUMENTS

| 1,906,715 | 5/1933 | Penick ............ 308/DIG. 1 X |
| 3,063,642 | 11/1962 | Point .................. 239/15 |
| 3,083,911 | 4/1963 | Griffiths .............. 239/15 |
| 3,121,533 | 2/1964 | Sedlacsik, Jr. ........ 239/15 |
| 3,128,045 | 4/1964 | Gauthier .............. 239/15 |
| 3,130,066 | 4/1964 | Brady ............... 117/93.43 |
| 3,155,539 | 11/1964 | Juvinall .............. 118/11 |
| 3,248,606 | 4/1966 | Fraser ................. 317/3 |
| 3,281,076 | 10/1966 | Burnside et al. ....... 239/7 |
| 3,504,851 | 4/1970 | Demeter ............... 239/15 |
| 3,512,502 | 5/1970 | Drum ................. 118/624 |
| 3,620,581 | 11/1971 | Heller et al. ......... 308/9 |
| 3,671,137 | 6/1972 | Ball ................. 308/9 X |
| 3,873,024 | 3/1975 | Probst ................ 239/15 |
| 3,985,405 | 10/1976 | Okano et al. ......... 308/9 |
| 4,148,932 | 4/1979 | Tada et al. ......... 239/700 X |

FOREIGN PATENT DOCUMENTS

| 1575545 | 2/1970 | Fed. Rep. of Germany ......... 308/9 |
| 2336181 | 7/1977 | France ................. 239/703 |
| 1213959 | 11/1970 | United Kingdom .......... 308/9 |

Primary Examiner—Andres Kashnikow
Attorney, Agent, or Firm—Kenyon & Kenyon

[57] ABSTRACT

A rotary type electrostatic spray painting device is comprised of a housing and a rotary shaft. The housing has an end plate having a circular hole, and the rotary shaft has a front end which passes through the circular hole. The diameter of the front end of the rotary shaft is slightly smaller than that of the circular hole thereby permitting air to pass therebetween. A spray head is fixed onto the tip of the front end of the rotary shaft at a distance from the end plate. Paint is fed onto the cup shaped inner wall of the spray head. The rotary shaft is supported by a single thrust air bearing and a pair of radial air bearings which are arranged near the rotary shaft at a hollow portion thereof. An electrode, continuously contacts the rear end of the rotary shaft to electrically connect a negative high voltage at the housing of the device to the spray head via the rotary shaft.

23 Claims, 6 Drawing Figures

ROTARY TYPE ELECTROSTATIC SPRAY PAINTING DEVICE

BACKGROUND OF THE INVENTION

The present invention relates to a rotary type electrostatic spray painting device.

One known electrostatic spray painting device which has been used for painting, for example, the bodies of motor cars, is of the rotary type and comprises a rotary shaft supported by ball bearings or roller bearings arranged within the housing of the painting device. A cup-shaped spray head is fixed onto the front end of the rotary shaft. In this painting device, a negative high voltage is applied to the spray head, and paint is fed onto the inner circumferential wall of the spray head. Thus, fine paint particles charged with electrons are sprayed from the spray head and are attracted by an electrostatic force onto the surface of the body of a motor car, which is grounded. As a result of this, the surface of the body of a motor car is painted. In such a rotary type electrostatic spray painting device, about 90 percent of the paint sprayed from the spray head, can be efficiently used for painting the surface to be painted. Thus, the amount of the paint which is wasted is small and, as a result, rotary type electrostatic spray painting devices are used in various industries.

In order to form a beautifully finished painted surface, it is necessary to reduce the size of the particles of paint as much as possible. In rotary type spray painting devices, the paint is divided into fine particles by using the centrifugal force caused by the rotation of the spray head. The strength of the centrifugal force, which corresponds to the rotating speed of the spray head, has a great influence on the size of the particles of paint. In other words, the higher the rotating speed of the spray head, the smaller the size of the particles of paint. Consequently, in order to form a beautifully finished surface by using a rotary type electrostatic spray painting device, it is desirable to increase the rotating speed of the spray head as much as possible. In conventional rotary type electrostatic spray painting devices, ball or roller bearings are used for supporting the shaft of the electrostatic spray painting device and, in addition, a lubricant, such as grease, is confined within the bearings. However, when such grease-lubricated bearings are rotated at a high speed, the bearings instantaneously deteriorate. Therefore, in conventional rotary type electrostatic spray painting devices which use bearings which are lubricated by grease, the maximum rotating speed of the rotary shaft is approximately 20,000 r.p.m. However, in known arrangements where the rotating speed of the spray head is about 20,000 r.p.m., the size of the particles of paint is relatively large, and it is therefore difficult to produce a beautifully finished surface.

The painting process for the bodies of motor cars comprises a primary spraying step, an undercoating step, and a finish painting step. However, since it is difficult to form a beautifully finished surface by using conventional rotary type electrostatic spray painting devices, such devices are used for carrying out the undercoating step, but cannot be used for carrying out the finish painting step.

One known system for lubricating ball and roller bearings injects lubricating oil of a low viscosity into the region between the inner and outer races of the ball or roller bearing. In this manner, the friction between the ball or roller and such races is greatly reduced and, at the same time, the heat caused by the friction is absorbed by the lubricating oil. In situations where the above-mentioned jet lubricating system is applied to a rotary type electrostatic spray painting device, it is possible to increase the rotating speed of the rotary shaft of the electrostatic spray painting device over devices where grease lubricated bearings are used. However, since the jet lubricating system requires a complicated and bulky lubricating oil feed arrangement, it is particularly difficult to apply such a jet lubricating system to a rotary type electrostatic spray painting device. In addition, if the lubricating oil mixes with the paint, the appearance of the painted surface is damaged. It is practically impossible to prevent the lubricating oil from leaking into the paint and, thus, it is inadvisable to apply the jet lubricating system to a rotary type electrostatic spray painting device.

A known electrostatic spray painting device which is capable of reducing the size of the particles of paint to a great extent divides the paint into fine particles by injecting a stream of air. In this air injection type electrostatic spray painting device, since the size of the particles of sprayed paint can be reduced to a great extent, as mentioned above, it is possible to form a beautifully finished surface. Consequently, the air injection type electrostatic spray painting device has been used for carrying out the finish painting step for the bodies of motor cars. It is a problem with known air injection type electrostatic spray painting devices that the sprayed paint impinges upon the surface to be painted together with the stream of the injection air and therefore a substantial portion of the sprayed paint escapes into the atmosphere with the stream of the injection air. The amount of the paint which adheres to the surface to be painted is only about 40 percent of the paint sprayed from the electrostatic spray painting device. Consequently, air injection type electrostatic spray painting devices suffer from the problem that the consumption of the paint is inevitably increased. A further problem occurs in that the paint which escapes with the stream of the injection air, causes air pollution within factories.

It is, therefore, an object of the present invention to provide an improved rotary type electrostatic spray painting device which reduces the size of the particles of paint which are sprayed and reduces the quantity of paint which is used, over known devices.

SUMMARY OF THE INVENTION

According to the present invention, there is provided a rotary type electrostatic spray painting device which comprises a metallic housing having an end plate which has a circular hole formed therein. A metallic rotary shaft is rotatably arranged in the housing, the shaft having a rear end, and a front end which passes through the circular hole and has a tip which projects from the end plate. The front end of the rotary shaft has a diameter which is slightly smaller than that of the circular hole. A cup-shaped metallic spray head is fixed onto the projecting tip of the front end and has a cup-shaped inner wall. There is further provided an arrangement for feeding paint onto the cup-shaped inner wall, and a drive mechanism which rotates the rotary shaft. An air inlet for receiving air under pressure is connected to an air injection type thrust air bearing which is arranged in the housing for axially supporting the rotary shaft via a clearance formed therebetween in a non-contacting state. In addition, a non-contact type radial bearing is arranged in the housing for radially supporting the rotary shaft in a non-contacting state. A terminal is provided for receiving a negative high voltage, the terminal being connected to the housing. Also, an electrode is arranged in the housing for electrically connecting the terminal to the spray head.

The present invention may be more fully understood from the description of preferred embodiments of the invention set forth below, together with the accompanying drawings.

DETAILED DESCRIPTION OF PREFERRED EMBODIMENTS

Figure 1:
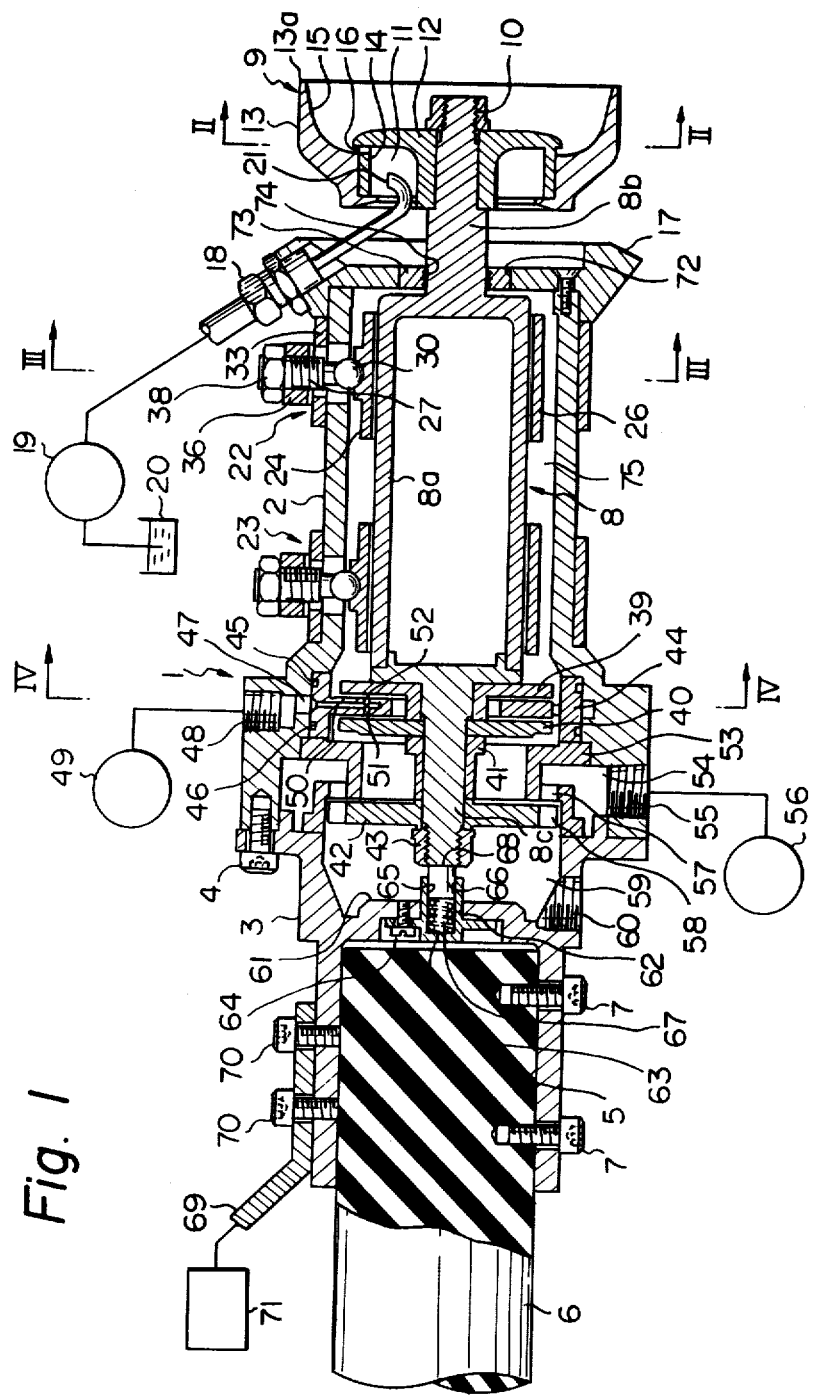
FIG. 1 is a cross-sectional side view of an embodiment of a rotary type electrostatic spray paint device according to the present invention.
Figure 2:
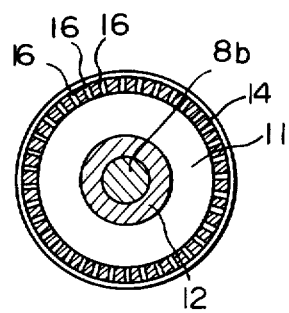
FIG. 2 is a cross-sectional view taken along the line II—II in FIG. 1.

Referring to FIG. 1, a rotary type electrostatic spray painting device, generally designated by reference numeral 1, is comprised of a generally hollow cylindrical front housing 2 made of metallic material, and a generally hollow cylindrical rear housing 3 made of metallic material. The front housing 2 and the rear housing 3 are firmly joined to each other by bolts 4. A support rod, made of electrically insulating material, 6 is fitted into cylindrical hole 5 formed in the rear housing 3, and this rear housing 3 is fixed onto the support rod 6 by bolts 7. The support rod 6 is supported by a base (not shown). A rotary shaft 8 is inserted into the front housing 2. This rotary shaft 8 comprises a hollow cylindrical portion 8a located in the middle thereof, a shaft portion 8b formed in one piece on the front end of the hollow cylindrical portion 8a, and a shaft portion 8c fixed onto the rear end of the hollow cylindrical portion 8a. A spray head 9 made of metallic material is fixed onto the shaft portion 8b of the rotary shaft 8 by a nut 10. The spray head 9 comprises a spray head supporting member 12 forming therein an annular space 11, and a cup shaped spray head body 13 fixed onto the spray head supporting member 12. As illustrated in FIGS. 1 and 2, a plurality of paint outflow bores 16, each opening into the annular space 11 and smoothly connected to an inner wall 15 of the spray head body 13, is formed in an outer cylindrical portion 14 of the spray head supporting member 12. As illustrated in FIG. 1, an end plate 17 is fixed onto the front end of the front housing 2, and a paint injector 18 is mounted on the end plate 17. The paint injector 18 is connected to a paint reservoir 20 via a paint feed pump 19, and a nozzle 21 of the paint injector 18 is directed to the cylindrical inner wall of the outer cylindrical portion 14 of the spray head supporting member 12.

Figure 3:
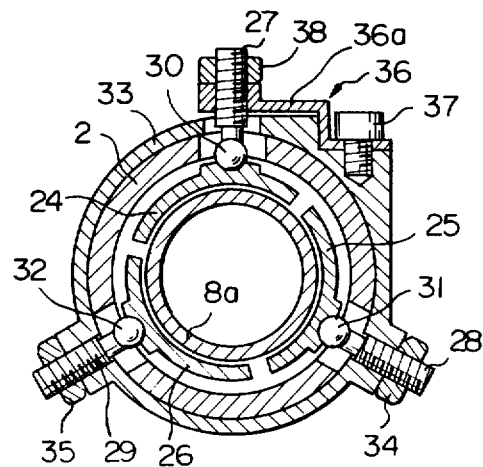
FIG. 3 is a cross-sectional view taken along the line III—III in FIG. 1.

A pair of non-contact type tilting pad radial air bearings 22 and 23 is arranged in the front housing 2, and the rotary shaft 8 is rotatably supported on the front housing 2 via a pair of the tilting pad radial air bearings 22 and 23. Both the tilting pad radial air bearings 22 and 23 have the same construction and, therefore, the construction of only the tilting pad radial air bearing 22 will be hereinafter described. Referring to FIGS. 1 and 3, the tilting pad radial air bearing 22 comprises three pads 24, 25, 26 spaced from the outer circumferential wall of the hollow cylindrical portion 8a of the rotary shaft 8 by an extremely small distance, and three support pins 27, 28, 29 supporting the pads 24, 25, 26, respectively. Spherical tips 30, 31, 32 are formed in one piece on the inner ends of the support pins 27, 28, 29, and are in engagement with spherical recesses formed on the rear faces of the pads 24, 25, 26, respectively. Consequently, the pads 24, 25, 26 can swing about the corresponding spherical tips 30, 31, 32, each functioning as a fulcrum. A bearing support frame 33 is fixed onto the outer circumferential wall of the front housing 2 by means of, for example, bolts (not shown), and the support pins 28, 29 are fixed onto the bearing support frame 33 by means of nuts 34, 35, respectively. In addition, one end of a support arm 36 having a resilient plate shaped portion 36a is fixed onto the bearing support frame 33 by means of a bolt 37, and the other end of the support arm 36 is fixed onto the support pin 27 by means of a nut 38. Consequently, the pad 24 is urged onto the hollow cylindrical portion 8a of the rotary shaft 8 due to the resilient force of the support arm 36.

Figure 4:
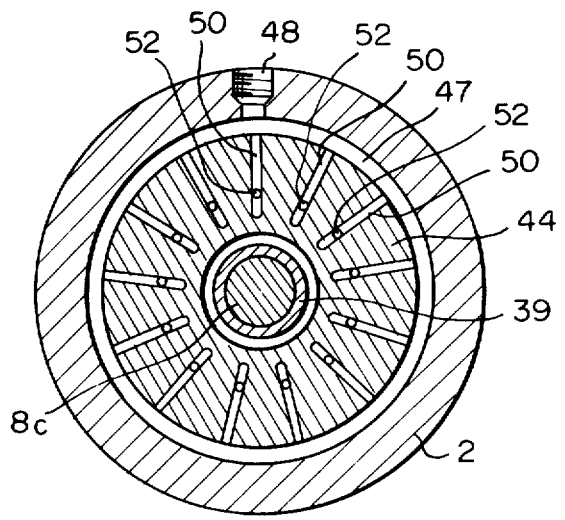
FIG. 4 is a cross-sectional view taken along the line IV—IV in FIG. 1.

Turning to FIG. 1, a pair of disc shaped runners 39, 40 is inserted into the shaft portion 8c of the rotary shaft 8 and fixed onto the shaft portion 8c via a spacer 41 and a turbine wheel 42 by means of a nut 43. A stationary annular plate 44 is arranged between the runners 39 and 40, and the runners 39, 40 and the annular plate 44 construct a non-contact type thrust air bearing. As illustrated in FIG. 1, each of the runners 39, 40 is spaced from the annular plate 44 by a slight distance. The annular plate 44 is fixed onto the front housing 2 via a pair of O rings 45, 46. As illustrated in FIGS. 1 and 4, an annular groove 47, extending along the outer circumferential wall of the annular plate 44, is formed on the inner wall of the front housing 2 and connected to an air feed pump 49 via a compressed air supply hole 48 which is formed in the front housing 2. A plurality of air passages 50, each extending radially inwardly from the annular groove 47, is formed in the annular plate 44. In addition, a plurality of air outflow bores 51, each extending towards the runner 40 from the inner end portion of the corresponding air passage 50, is formed in the annular plate 44, and a plurality of air outflow bores 52, each extending towards the runner 39 from the inner end portion of the corresponding air passage 50, is formed in the annular plate 44.

As illustrated in FIG. 1, a turbine nozzle holder 53 is fixed into the front housing 2 at a position adjacent to the annular plate 44, and an annular air supply chamber 54 is formed between the turbine nozzle holder 53 and the front housing 2. The air supply chamber 54 is connected to a compressor 56 via a compressed air supply hole 55. The air supply chamber 54 comprises a compressed air injecting nozzle 57 having a plurality of guide vanes (not shown), and turbine blades 58 of the turbine wheel 42 are arranged to face the compressed air injecting nozzle 57. A housing interior chamber 59, in which the turbine wheel 42 is arranged, is connected to the atmosphere via a discharge hole 60 which is formed in the rear housing 3. The compressed air fed into the air supply chamber 54 from the compressor 56 is injected into the housing interior chamber 59 via the compressed air injecting nozzle 57. At this time, the compressed air injected from the injecting nozzle 57 provides the rotational force for the turbine wheel 42 and, thus, the rotary shaft 8 is rotated at a high speed. Then, the compressed air injected from the injecting nozzle 57 is discharged to the atmosphere via the discharge hole 60.

A through-hole 62 is formed on an end wall 61 of the rear housing 3, which defines the housing interior chamber 59, and an electrode holder 63 extending through the through hold 62 is fixed onto the end wall 61 by means of bolts 64. A cylindrical hole 65 is formed coaxially with the rotation axis of the rotary shaft 8 in the electrode holder 63, and a cylindrical electrode 66, made of wear resisting materials such as carbon, is inserted into the cylindrical hole 65 so as to be movable therein. In addition, a compression spring 67 is inserted between the electrode 66 and the electrode holder 63 so that the tip face 68 of the electrode 66 is urged onto the end face of the shaft portion 8c of the rotary shaft 8 due to the spring force of the compression spring 67. An external terminal 69 is fixed onto the outer wall of the rear housing 3 by means of bolts 70 and connected to a high voltage generator 71 used for generating a negative high voltage ranging from −60 kV to −90 kV. Consequently, the negative high voltage is applied to both the front housing 2 and the rear housing 3, and it is also applied to the spray head 9 via the electrode 66 and the rotary shaft 8. Since electrode 66 is at least partially disposed in chamber 59, it is subjected to the cooling effect of the compressed air as it flows through chamber 59 toward discharge hole 60.

As illustrated in FIG. 1, a seal member 73 is fixed onto a circular hole 72 formed in the center of the end plate 17, and an inner circumferential wall 74 of the seal member 73 has a labyrinth construction. In addition, the inner circumferential wall of the seal member 73 is arranged near the outer circumferential wall of the shaft portion 8b of the rotary shaft 8 as closely as possible without contacting the shaft portion 8b. The compressed air, injected from the air outflow bores 52 of the annular plate 44, passes through the clearance between the annular plate 44 and the runner 39 and, then, flows into the space 75 between the front housing 2 and the hollow cylindrical portion 8a of the rotary shaft 8. At this time, the pressure of the air flowing into the space 75 is higher than the atmospheric pressure. Then, the air within the space 75 is pushed out into the exterior of the front housing 2 via a small clearance between the inner circumferential wall of the seal member 73 and the outer circumferential wall of the shaft portion 8b.

Since the electrode 66 is in contact with the end face of the shaft portion 8c while sliding on it, there is a possibility that an electric spark will occur between the electrode 66 and the shaft portion 8c. In addition, in the case wherein, for example, the contact between the electrode 66 and the end face of the shaft portion 8c becomes incomplete, a potential difference is caused between the annular plate 44 and the runners 39, 40 or between the rotary shaft 8 and the pads 24, 25, 26 and, as a result, there is a danger that an electric discharge will occur between them. Consequently, if an inflammable paint or an inflammable thinner, used for cleaning the spray head 9 when the color of the paint to be used is changed, enters into the interior of the front housing 2, (it may occur that) such paint or thinner may catch fire and, as a result, a fire breaks out. However, in the rotary type electrostatic spray painting device according to the present invention, since the air is spouted into the exterior of the front housing 2 from the small clearance between the inner circumferential wall of the seal member 73 and the outer circumferential wall of the shaft portion 8b, it is possible to prevent the paint or the thinner from entering into the space 75 within the front housing 2 and, as a result, fire is prevented from breaking out.

In operation, paint is injected from the nozzle 21 of the paint injector 18 onto the circumferential inner wall of the outer cylindrical portion 14 of the spray head supporting member 12. Then, the paint, injected onto the circumferential inner wall of the outer cylindrical portion 14, flows out onto the inner wall 15 of the spray head body 13 via the paint outflow bores 16 due to the centrifugal force caused by the rotation of the spray head 9. After this, the paint spreads on the inner wall 15 of the spray head body 13 and flows on the inner wall 15 in the form of a thin film. Then, the paint reaches the tip 13a of the spray head body 13. As mentioned previously, a negative high voltage is applied to the spray head 9. Consequently, when the paint is sprayed from the tip 13a of the spray head body 13 in the form of fine particles, the particles of the sprayed paint are charged with electrons. Since the surface to be painted is normally grounded, the paint particles charged with electrons are attracted towards the surface to be painted due to electrical force and, thus, the surface to be painted is painted.

As mentioned previously, the rotary shaft 8 is supported by a pair of tilting pad radial air bearings 22, 23 and a single thrust air bearing which is constructed by the runners 39, 40 and the stationary annular plate 44. In the tilting pad radial air bearings 22, 23, when the rotary shaft 8 is rotated, ambient air is sucked into the extremely small clearances formed between the hollow cylindrical portion 8a and the pads 24, 25, 26. Then, the air thus sucked is compressed between the hollow cylindrical portion 8a and the pads 24, 25, 26 due to a so-called wedge effect of air, and therefore, the pressure of the air between the hollow cylindrical portion 8a and the pads 24, 25, 26 is increased. As a result of this, the force radially supporting the rotary shaft 8 is generated between the hollow cylindrical portion 8a and the pads 24, 25, 26. On the other hand, in the above-mentioned thrust air bearing, compressed air is fed into the air passages 50 from the air feed pumps 49 via the annular groove 47. Then, the compressed air is injected from the air outflow bores 51 into the clearance between the annular plate 44 and the runner 40, and also, injected from the air outflow bores 52 into the clearance between the annular plate 44 and the runner 39. As a result of this, the pressure, which is necessary to maintain the above-mentioned clearances formed on each side of the annular plate 44, is generated between the annular plate 44 and the runners 39, 40. Consequently, the rotary shaft 8 is supported by the thrust air bearing and a pair of the radial air bearings under a non-contacting state via a thin air layer. As is known to those skilled in the art, the coefficient of viscosity of air is about one thousandth of that of the viscosity of lubricating oil. Consequently, the frictional loss in the air bearing, which uses air as a lubricant, is extremely small. Therefore, since the amount of heat caused by the occurrence of the frictional loss is extremely small, it is possible to increase the rotating speed of the rotary shaft 8 to a great extent. In the embodiment illustrated in FIG. 1, it is possible to rotate the rotary shaft 8 at a high speed of about 80,000 r.p.m.

Figure 6:
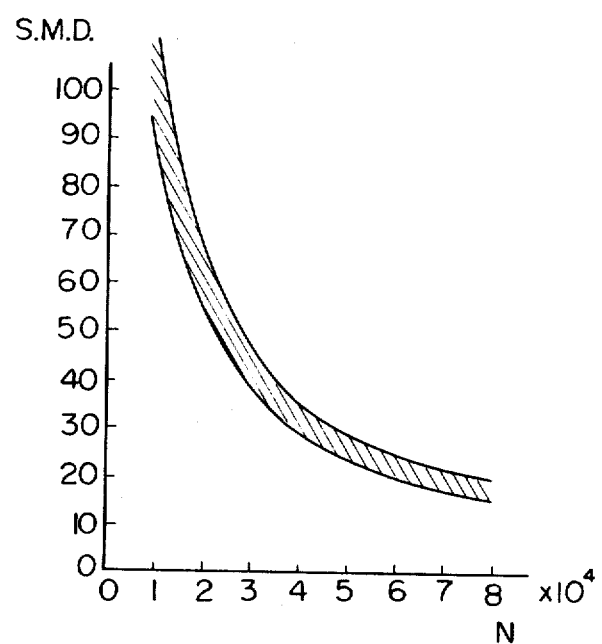
FIG. 6 is a graph showing the relationship between the size of paint particles and the rotating speed of the spray head.

FIG. 6 illustrates the relationship between the size of the particles of sprayed paint and the rotating speed of the spray head in the case wherein the spray head 9 (FIG. 1) having a diameter of 75 mm is used. In FIG. 6, the ordinate S.M.D. indicates the mean diameter ($\mu$m) of paint particles, which is indicated in the form of a Sauter mean diameter, and the abscissa N indicates the number of revolutions per minute (r.p.m.) of the spray head 9. As mentioned previously, in a conventional rotary type electrostatic spray painting device, the maximum number of revolutions per minute N of the spray head is about 20,000 r.p.m. Consequently, from FIG. 6, it will be understood that, if the spray head having a diameter of 75 mm is used in a conventional rotary type electrostatic spray painting device, the minimum mean diameter S.M.D. of paint particles is in the range of 55 $\mu$m to 65 $\mu$m. Contrary to this, in the present invention, the maximum number of revolutions per minute N is about 80,000 r.p.m. Consequently, from FIG. 6, it will be understood that the paint can be divided into fine particles to such a degree that the mean diameter S.M.D. of paint particles is in the range of 15 $\mu$m to 20 $\mu$m. Therefore, it will be understood that, in a rotary type electrostatic spray painting device according to the present invention, the size of paint particles can be greatly reduced, as compared with that of paint particles in a conventional rotary type spray painting device. In addition, as mentioned previously, the same negative high voltage is applied to the housings 2, 3 and the rotary shaft 8. Consequently, there is normally no danger that an electric discharge will occur between the housings 2, 3 and the rotary shaft 8.

Figure 5:
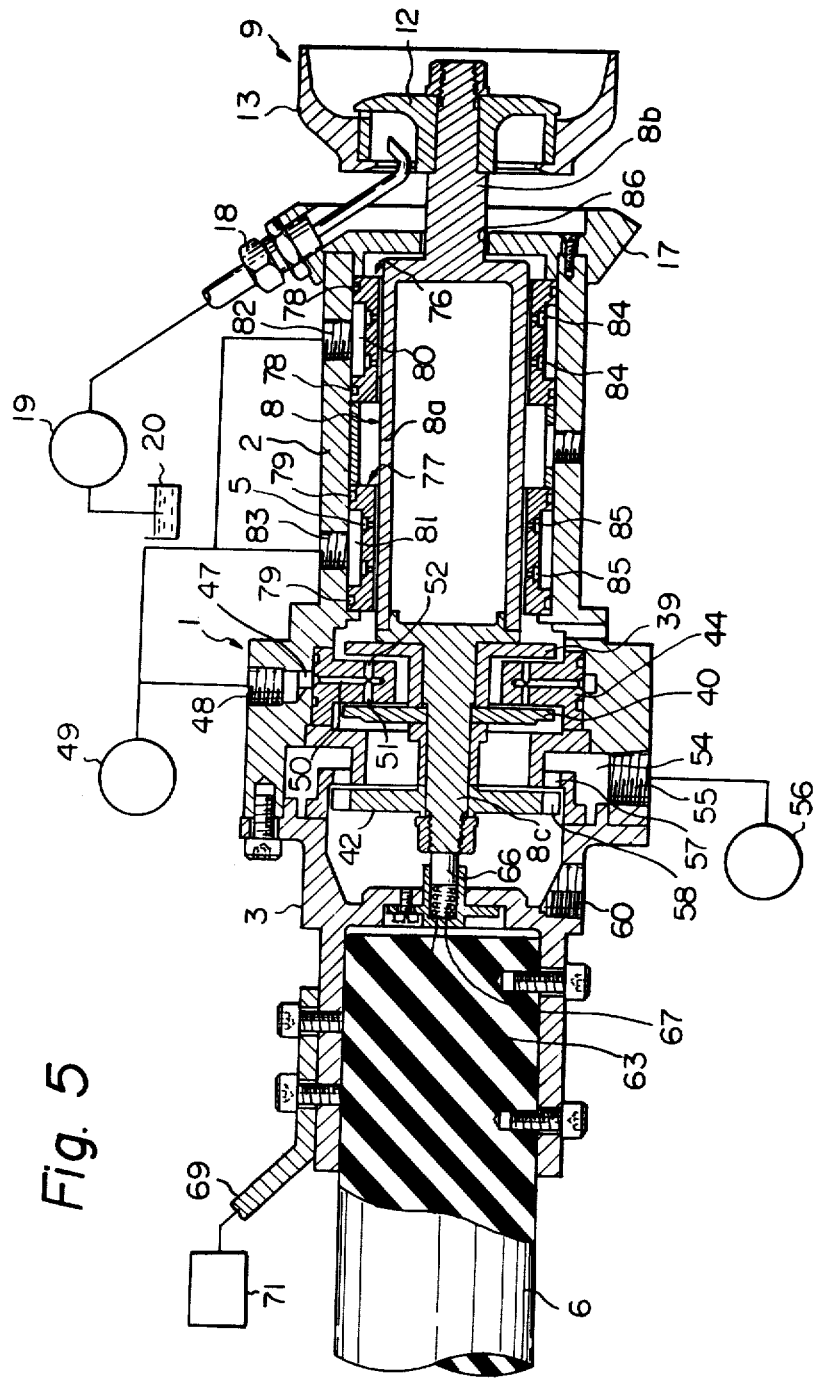
FIG. 5 is a cross-sectional side view of another embodiment of a rotary type electrostatic spray painting device according to the present invention.

FIG. 5 illustrates an alternative embodiment. In FIG. 5, similar components are indicated with the same reference numerals as used in FIG. 1. In this embodiment, a pair of static pressure radial air bearings 76, 77 is provided for supporting the rotary shaft 8. The static pressure radial air bearing 76 is fixed onto the front housing 2 via a pair of O rings 78, and the static pressure radial air bearing 77 is fixed onto the front housing 2 via a pair of O rings 79. Air supply chambers 80 and 81 are formed in the static pressure radial air bearings 76 and 77, respectively, and connected to the air feed pump 49 via corresponding air inlets 82 and 83. A plurality of air outflow bores 84, connected to the air supply chamber 80, is formed on the inner circumferential bearing face of the static pressure radial air bearing 76, and a plurality of air outflow bores 85, connected to the air supply chamber 81, is formed on the inner circumferential bearing wall of the static pressure radial air bearing 77. The rotary shaft 8 is supported under a non-contacting state by the air injected from the air outflow bores 84, 85.

As illustrated in FIG. 5, the shaft protion 8b of the rotary shaft 8 passes through a circular hole 86 formed on the center of the end plate 17 and projects outward from the end plate 17. The cylindrical inner circumferential wall of the circular hole 86 is arranged near the outer circumferential wall of the shaft portion 8b as closely as possible without contacting the shaft portion 8b. In this embodiment, air, injected from the air outflow bores 84, flows out into the exterior of the front housing 2 via the annular clearance between the inner circumferential wall of the hole 86 and the outer circumferential wall of the shaft portion 8b and, as a result, it is possible to prevent paint or thinner from entering into the interior of the front housing 2. The inner circumferential wall of hole 86 may be provided with a labyrinth construction as shown with respect to seal member 73 in FIG. 1.

According to the present invention, since the spray head can be rotated at a high speed of about 80,000 r.p.m., the size of the particles of sprayed paint can be reduced to a great extent. As a result of this, this size of paint particles becomes smaller than that of paint particles obtained by using a conventional air injection type electrostatic spray painting device. Consequently, in the present invention, it is possible to obtain an extremely beautiful finished surface and, therefore, a rotary type electrostatic spray painting device can be used for carrying out a finish painting step in the paint process, for example, for bodies of motor cars. In addition, in the present invention, since paint particles are created by rotating the spray head at a high speed, but are not created by air injection, the amount of the paint used to effectively paint the surface to be painted is about 90 percent of the amount of the paint sprayed from a rotary type electrostatic spray painting device. Consequently, since a large part of the sprayed paint is not dispersed within the factory, it is possible to prevent the problem of air pollution from arising. In addition, the amount of paint used can be reduced. Furthermore, since it is possible to prevent paint or thinner from entering into the interior of the housing, it is possible to completely prevent fire from breaking out.

While the invention has been described by reference to specific embodiments chosen for purposes of illustration, it should be apparent that numerous modifications could be made thereto by those skilled in the art without departing from the basic concept and scope of the invention.

We claim:

1. A rotary type electrostatic spray painting device comprising:
   a metallic housing having an end plate which has a circular hole formed therein, said circular hole having a predetermined diameter and a circumferential interior wall;
   a metallic rotary shaft rotatably arranged in said housing, said rotary shaft having a rear solid portion, and a front solid portion which passes through said circular hole and has a projecting tip which projects axially forward from said end plate, said front solid portion of said rotary shaft having a diameter which is smaller than said predetermined diameter of said circular hole for providing a space intermediate of said front solid portion of said rotary shaft and said interior wall of said circular hole, said front solid portion of said rotary shaft and said interior wall of said circular hole forming an exhaust air conduit, said rotary shaft further having a hollow portion arranged coaxially between said front and rear solid portions;
   a cup-shaped metallic spray head fixed into said projecting tip of said front solid portion of said rotary shaft and having a cup-shaped inner wall, said spray head being disposed at a predetermined axially forward distance from said end plate;
   feeding means for feeding a paint onto said cup-shaped inner wall;
   drive means cooperating with said rotary shaft for rotating said rotary shaft;

air supply coupling means for receiving air under pressure;

air injection type thrust air bearing means arranged in said housing adjacent to said rear solid portion of said rotary shaft for axially supporting said rotary shaft via a clearance formed therewithin in a non-contacting state, said thrust air bearing means being connected to said air supply coupling means for conducting air into said clearance;

non-contact type radial bearing means arranged in said housing and cooperating with said hollow portion of said rotary shaft for radially supporting said rotary shaft in a non-contacting state;

terminal means for receiving a negative high voltage, said terminal means being electrically connected to said housing, and;

electrode means arranged in said housing for electrically coupling said terminal means to said spray head.

2. A rotary type electrostatic spray painting device as claimed in claim 1, wherein said circumferential interior wall has a labyrinth construction.

3. A rotary type electrostatic spray painting device as claimed in claim 1, wherein said non-contact type radial bearing means comprises a pair of radial air bearings.

4. A rotary type electrostatic spray painting device as claimed in claim 3, wherein each of said radial air bearings comprises a bearing frame connected to said housing, a plurality of pads, each pad having an inner face which extends along a circumferential outer wall of said hollow portion of said rotary shaft and arranged to be spaced from said circumferential outer wall of said hollow portion of said rotary shaft by a predetermined radial distance, and a plurality of support pins, each of said support pins being connected to said bearing frame and pivotally supporting a corresponding one of said plurality of pads.

5. A rotary type electrostatic spray painting device as claimed in claim 4, wherein each of said radial air bearings further comprises a resilient arm through which a selected one of said support pins is connected to said bearing frame for biasing a respectively associated one of said plurality of pads to circumferential outer wall of said hollow portion of said rotary shaft.

6. A rotary type electrostatic spray painting device as claimed in claim 4, wherein each of said pads has an outer wall forming a spherical recess thereon, each of said support pins having a spherical tip which is in engagement with the spherical recess of said respectively associated pad.

7. A rotary type electrostatic spray painting device as claimed in claim 3, wherein each of said radial air bearings has an air feed chamber connected to said air supply coupling means for conducting compressed air into a clearance formed between said radial air bearing and said hollow portion of said rotary shaft.

8. A rotary type electrostatic spray painting device as claimed in claim 7, wherein each of said radial air bearings has an inner bearing wall facing a circumferential outer wall of said hollow portion of said rotary shaft and having formed therein a plurality of air outflow bores.

9. A rotary type electrostatic spray painting device as claimed in claim 1 wherein said air injection type thrust air bearing means comprises a stationary annular plate having opposed side walls, and a pair of runners fixed onto said rear solid portion of said rotary shaft and arranged on each side of said annular plate, each of said runners being spaced from the corresponding side wall of said annular plate, a plurality of air outflow bores connected to said air supply coupling means being formed on the opposed side walls of said annular plate.

10. A rotary type electrostatic spray painting device as claimed in claim 9, wherein said annular plate forms therein a plurality of radially extending air passages, each connecting said corresponding air outflow bore to said air supply coupling means.

11. A rotary type electrostatic spray painting device as claimed in claim 1, wherein said electrode means comprises an electrode which is arranged to continuously contact with said rear end of said rotary shaft.

12. A rotary type electrostatic spray painting device as claimed in claim 11, wherein said electrode is made of carbon.

13. A rotary type electrostatic spray painting device as claimed in claim 11, wherein said rear solid portion of said rotary shaft has a flat end face extending perpendicular to the rotation axis of said rotary shaft, said electrode being arranged coaxially with the rotation axis of said rotary shaft and having a flat end face which is in contact with the flat end face of said rear solid portion of said rotary shaft.

14. A rotary type electrostatic spray painting device as claimed in claim 11, wherein said electrode means further comprises an electrode holder fixed onto said housing and having therein a cylindrical bore into which said electrode is slidably inserted, and a compression spring arranged in said cylindrical bore of said electrode holder between said electrode holder and said electrode.

15. A rotary type electrostatic spray painting device as claimed in claim 1, wherein said drive means comprises an air injection nozzle arranged in said housing, and a turbine wheel fixed onto said rotary shaft and having a turbine blade which is arranged to face said air injection nozzle.

16. A rotary type electrostatic spray painting device as claimed in claim 1, wherein said cup shaped spary head comprises a cylindrical inner wall arranged coaxially with the rotation axis of said rotary shaft and defining therein an annular space, a plurality of paint outflow bores being formed in the cylindrical inner wall of said spray head and smoothly connected to the cup shaped inner wall of said spray head, said feed means having a paint injection nozzle which is arranged in said annular space.

17. A rotary type electrostatic spray painting device comprising:
 a metallic housing having an end plate which has a circular hole formed therein, said circular hole having a predetermined diameter and a circumferential interior wall;
 a metallic rotary shaft rotatably arranged in said housing, said rotary shaft having a rear solid portion, and a front solid portion which passes through said circular hole and has a projecting tip which projects axially forward from said end plate, said front solid portion of said rotary shaft having a diameter which is smaller than said predetermined diameter of said circular hole said shaft further having a hollow shaft portion arranged coaxially with and intermediate of said rear and front solid portions;
 a cup-shaped metallic spray head fixed onto said projecting tip of said front solid portion of said rotary shaft and having a cup-shaped inner wall;

feeding means for feeding a paint onto said cup-shaped inner wall;

drive means arranged adjacent to said rear solid portion of said rotary shaft for rotating said rotary shaft;

air supply coupling means for receiving air under pressure;

air injection type radial air bearing means arranged in said housing for radially supporting said rotary shaft at said hollow shaft portion via a clearance formed therebetween in a non-contacting state, said bearing means being connected to said air supply coupling means for conducting air into said clearance;

non-contact type thrust bearing means arranged in said housing and adjacent to said rear solid portion of said rotary shaft for axially supporting said rotary shaft in a non-contacting state;

terminal means for receiving a negative high voltage, said terminal means being connected to said housing, and;

electrode means arranged in said housing for electrically coupling said terminal means to said spray head.

18. A rotary type electrostatic spray painting device as claimed in claim 17, wherein said circumferential interior wall has a labyrinth construction.

19. A rotary type electrostatic spray painting device as claimed in claim 17, wherein said non-contact type thrust bearing means comprises a thrust air bearing.

20. A rotary type electrostatic spray painting device as claimed in claim 17, wherein said air injection type radial air bearing means comprises a pair of radial air bearings.

21. A rotary type electrostatic spray painting device as claimed in claim 20, wherein each of said radial air bearings has an air feed chamber connected to said air supply coupling means for conducting compressed air into a clearance formed between said radial air bearing and said hollow shaft portion of said rotary shaft.

22. A rotary type electrostatic spray painting device as claimed in claim 21, wherein each of said radial air bearings has an inner bearing wall facing a circumferential outer wall of said hollow shaft portion of said rotary shaft and forming thereon a plurality of air outflow bores.

23. A rotary type electrostatic spray painting device comprising:

a metallic housing having an end plate which has a circular hole formed therein, said circular hole having a predetermined diameter and a circumferential interior wall;

a metallic rotary shaft rotatably arranged in said metallic housing, said shaft having a rear solid portion, and a front solid portion which passes through said circular hole and has a projecting tip which projects axially forward from said end plate, said front solid portion of said rotary shaft having a diameter which is smaller than said predetermined diameter of said circular hole;

a cup-shaped metallic spray head fixed onto said projecting tip of said front solid portion of said rotary shaft and having a cup-shaped inner wall;

feeding means for feeding a paint onto said cup-shaped inner wall;

drive means arranged adjacent to said rear solid portion of said rotary shaft for rotating said rotary shaft;

air supply coupling means for receiving air under pressure and introducing said compressed air into said metallic housing, said compressed air flowing within said metallic housing along at least a first predetermined air path;

non-contact type thrust bearing means arranged in said housing and cooperating with said rotary shaft for axially supporting said rotary shaft in a non-contacting state;

non-contact type radial bearing means arranged in said metallic housing and adjacent to said hollow portion of said rotary shaft for radially supporting said rotary shaft in a non-contacting state;

terminal means for receiving a negative high voltage, said terminal means being connected to said housing; and electrode means arranged in said housing for electrically connecting said terminal means to said rotary shaft, at least a portion of said electrode means being arranged in said first predetermined air path for cooling said electrode means.

* * * * *